(12) United States Patent
Ek et al.

(10) Patent No.: US 6,187,402 B1
(45) Date of Patent: Feb. 13, 2001

(54) MULTILAYER PIPE

(75) Inventors: Carl-Gustaf Ek, Vastra Frolunda (SE); Bo Malm, Espoo; Anders Nymark, Porvoo, both of (FI)

(73) Assignee: Borealis A/S, Lyngby (DK)

( * ) Notice: Under 35 U.S.C. 154(b), the term of this patent shall be extended for 0 days.

(21) Appl. No.: 09/146,604

(22) Filed: Sep. 3, 1998

Related U.S. Application Data

(63) Continuation of application No. PCT/SE97/00344, filed on Mar. 3, 1997.

(30) Foreign Application Priority Data

Mar. 4, 1996 (SE) .................................................. 9600826-3
Apr. 19, 1996 (FI) ....................................................... 96 1722

(51) Int. Cl.[7] .............................. B32B 27/32; B32B 1/08; F16L 9/12
(52) U.S. Cl. ...................... 428/36.91; 428/515; 428/516; 428/517; 428/523; 525/88; 525/89; 525/240
(58) Field of Search ................................... 428/575, 576, 428/517, 523, 36.9, 36.91; 525/240, 88, 89

(56) References Cited

U.S. PATENT DOCUMENTS

| 3,737,557 | * | 6/1973 | Verne et al. ......................... 174/23 R |
| 4,784,983 | | 11/1988 | Mao et al. ............................ 502/111 |
| 5,234,879 | | 8/1993 | Garoff et al. ......................... 502/107 |
| 5,571,585 | * | 11/1996 | Yoshida et al. ..................... 428/36.91 |

FOREIGN PATENT DOCUMENTS

| 42 02 397 C1 | 2/1993 | (DE) . |
| 42 02 399 C1 | 2/1993 | (DE) . |
| 0 659 534 A2 | 6/1995 | (EP) . |
| 2 289 108 | 11/1995 | (GB) . |
| WO96/22485 | * 7/1996 | (GB) . |
| 3-48214 | 7/1991 | (JP) . |
| WO 91/00466 | 1/1991 | (WO) . |
| WO 97/40080 | * 10/1997 | (WO) . |

OTHER PUBLICATIONS

Encyclopedia of Polymer Science and Engineering, Second Edition, vol. 6, pp. 545–558.
D. Djordjevic, "Coextrusion", Rapa Review Reports, vol. 6, No. 2, 1992, pp. 51–53.
ISO, Draft International Standard, Thermoplastics pipes for the conveyance of fluids—Resistance to crack propagation – Determination of the critical pressure for rapid crack propagation [small–scale steady–state test (method S4)], 1994.
Masahiro Kakugo, Hajime Sadatoshi, 'Impact–Resistance Polypropylene', Sumimoto Kagaku, 1979, pp. 22–32.*

* cited by examiner

Primary Examiner—Rena L. Dye
Assistant Examiner—Sow-Fun Hon
(74) Attorney, Agent, or Firm—Merchant & Gould P.C.

(57) ABSTRACT

A multilayer pipe having improved resistance to rapid crack propagation is described.; The pipe consists of at least two layers of different propylene plastic materials, which are so selected and combined that the pipe has a resistance to rapid crack propagation, measured as the critical temperature, which is equal to or lower than 0° C. The pipe is made of polypropylene plastic, and at least one of the layers of the pipe comprises a polypropylene plastic, which is selected from a propylene contanig from 1.0 to 10.0% by weight of ethylene or $C_4$–$C_{10}$-α-olefin repeating units and having an $MFR_2$ value of between 0.05 and 0.40 g/10 min or an elastromer-modified polypropylene containing from 1.0 to 30% by weight of ethylene or $C_4$–$C_{10}$-α olefin repeating units and having an $MFR_2$ value of between 0.05 and 50 g/10 min.

10 Claims, No Drawings

MULTILAYER PIPE

This application is a continuation of PCT/SE97/00344 filed Mar. 3, 1997.

FIELD

The present invention relates to a multilayer pipe, and more specifically to a multilayer pressure pipe of polypropylene plastic with improved resistance to rapid crack propagation, high creep resistance and high long-term pressure resistance.

By pressure pipe is meant a pipe which, when used, is subjected to a positive pressure, i.e. the pressure inside or outside the pipe is higher than the pressure outside or inside the pipe, respectively.

BACKGROUND

Nowadays, pipes of polymer material are frequently used for various purposes, such as fluid transport, i.e. transport of liquid or gas, e.g. water or natural gas, during which the fluid can be pressurised. Moreover, the transported fluid may have varying temperatures, usually not outside the temperature range from about −40° C. to about 100° C. Such pipes are now preferably made of polyolefin plastic, such as ethylene plastic (HDPE, MDPE), or of polyvinyl chloride (PVC) or alternatively of other materials that are not necessarily based on polymer.

A drawback of such pipes at low temperatures is that if they are subjected to stress which initiates a crack, this crack can be spread or propagated very fast a considerable distance in the pipe and cause catastrophic failure of the pipe. The speed of propagation of the crack can be as high as about 100–300 m/s in the longitudinal direction of the pipe. This type of cracking is generally called rapid crack propagation (RCP), which is a generic term. To make a pressure pipe of plastic material acceptable, it should, at a certain temperature and a certain inner pressure, not have rapid crack propagation greater than 4 times the pipe diameter in the longitudinal direction of the pipe.

The RCP properties of a given pipe can be determined in various ways. According to one method, called the S4 test (Small Scale Steady State), which has been developed at Imperial College, London, and which is described in ISO DIS 13477, a pipe is tested, which has an axial length not below 7 pipe diameters. The outer diameter of the pipe is about 110 mm or greater and its wall thickness about 10 mm or greater. When determining the RCP properties of a pipe in connection with the present invention, the outer diameter and the wall thickness have been selected to be 110 mm and 10 mm, respectively. While the exterior of the pipe is at ambient pressure (atmospheric pressure), the pipe is pressurised internally, and the internal pressure in the pipe is kept constant at a pressure of 0.5 MPa positive pressure. A number of discs have been mounted on a shaft inside the pipe to prevent decompression during the tests. A knife projectile is shot, with well-defined forms, towards the pipe close to its one end in the so-called initiating zone in order to produce a rapidly running axial crack. The initiating zone is provided with an abutment for avoiding unnecessary deformation of the pipe. The test equipment is adjusted in such manner that crack initiation takes place in the material involved, and a number of tests are effected at varying temperatures. The axial crack length in the measuring zone, having a total length of 4.5 diameters, is measured for each test and is plotted against the measured temperature. If the crack length exceeds 4 diameters, the crack is assessed to propagate. If the pipe passes the test at a given temperature, the temperature is lowered successively until a temperature is reached, at which the pipe no longer passes the test, but the crack propagation exceeds 4 times the pipe diameter. The critical temperature ($T_{crit}$) is the lowest temperature at which the pipe passes the test. The lower the critical temperature the better, since it results in an extension of the applicability of the pipe. It is desirable for the critical temperature to be as low as possible.

In this context, it should be mentioned that some plastic materials have so poor RCP properties (high $T_{crit}$) that the value of $T_{crit}$ exceeds the normal measuring limit for $T_{crit}$ which is +23° C. In such cases, use is conventionally made, for the purpose of the present invention, of a $T_{crit}$ value of +23° C. for these materials.

For bimodal polyethylene plastic intended for pipes that are required to be resistant to RCP, $T_{crit}$ generally is in the range of from about 0° C. to about −25° C., whereas $T_{crit}$ for a conventional polypropylene homopolymer is above about +23° C.

Another method of determining the RCP properties for a pressure pipe of plastic is to determine the critical pressure, $P_{crit}$, instead. The method conforms with the above-described method, but instead of keeping the pressure constant and successively lowering the temperature, the temperature is kept constant at 0° C.±2° C. and the pressure sure in the pipe is successively increased. The highest pressure at which the pipe still passes the test, is called the critical pressure, $P_{crit}$ The method for determining $P_{crit}$ is less preferred in connection with the development of materials, since the tested pipe must usually be subjected to such high pressures as 1 MPa or more, which involves risks and difficulties. Therefore, the method of determining $T_{crit}$ is preferred and used in the present invention.

It would mean a great advantage if it is was possible to provide pipes of polypropylene material having improved resistance to rapid crack propagation, RCP. It would be particularly advantageous if it was possible to provide pressure pipes of polypropylene material having a $T_{crit}$ below 0° C., preferably below −5° C.

SUMMARY

According to the present invention, it has been found that pipes of polypropylene material with improved resistance to rapid crack propagation can be achieved by making the pipes of several layers of different polypropylene plastic materials, at least one of the layers being made of a special polypropylene composition.

According to the invention, it is possible, by making a pipe of suitably selected and combined layers of different polypropylene plastic materials, to accomplish resistance to rapid crack propagation, measured as $T_{crit}$ of the multilayer pipe, which is better than 0° C.

According to a specially preferred aspect of the invention, a multilayer pipe is provided, whose resistance to rapid crack propagation, measured as $T_{crit}$, is better than −5° C., preferably better than −10° C.

According to the invention, not only high resistance to rapid crack propagation is achieved, but it is according to the invention possible to improve also a number of other important properties. By the multilayer pipe according to the invention comprising polypropylene plastic only, good adhesion is thus obtained between the various layers of the pipe, and it is not necessary to use any particular adhesion layers between the plastic layers of the pipe. By the multilayer pipe according to the invention comprising polypropylene plastic only, it is also possible easily to reclaim old pipes according to the invention and use them for the manufacture of new polypropylene pipes. This is an important economic and environmental aspect.

According to the invention, it is also possible, by combining in a suitable manner layers of different polypropylene plastic materials, to provide multilayer pipes having a high long-term pressure resistance of at least 10, preferably 11.2, more preferably 12.5 and most preferably 14.0 MPa extrapolated design stress at 20° C. during 50 years according to ISO 8090. Polypropylene has hitherto not generally been used for pressure pipe applications at these comparatively high stress levels.

According to the invention, it is also possible to provide multilayer pipes of polypropylene plastic material having a high creep resistance so that the creep level is only ⅓ to ½ of that for regular pipe grade polypropylene material. Thus, a regular pipe grade polypropylene-random-copolymer material has a creep of 3.3 mm after 100 h and 3.7 mm after 400 h at 60° C. and 7.3 MPa, while a polypropylene-random-homopolymer pipe material according to the invention has a creep of only 0.8 mm and 0.9 mm, respectively, under the same conditions.

The characteristic features of the invention are evident from the accompanying claims.

DETAILED DESCRIPTION

As mentioned before, the multilayer polypropylene plastic pipe according to the present invention is characterised in that at least one of the layers of the pipe consists of a special polypropylene plastic composition which will be described in more detail below.

By polypropylene plastic or propylene plastic is meant a plastic based on polypropylene or on copolymers of propylene, the propylene monomer constituting the largest part of the mass. Thus, the polypropylene plastic may consist of homopolymers, copolymers or block copolymeres of propylene. The copolymers can be graft copolymers or copolymers of propylene and one or more other monomers copolymerisable with propylene.

The layer or layers of the multilayer pipe according to the invention that do not consist of the below described, special propylene plastics A and/or B, may consist of other conventional propylene plastics as described above, in which case the polymer that could substitute propylene plastic A should be a PP-random copolymer, a PP-homopolymer or a PP-random copolymer/PP-homopolymer blend characterised by having an $MFR_2$ value of 0.05–0.4 g/10 min and a comonomer content equal to or ess than 5% by weight, said comonomer being selected from ethylene and $C_4$–$C_{10}$-α-olefins such as 1-butene, 4-methyl pentene, 1-hexene and 1-octene, and the polymer that could substitute the propylene plastic B should be a PP characterised by having a rubbery phase constituting about 10–30% by weight of the total polymer, a total ethylene content of about 4–15% by weight, an $MFR_2$ value of 0.05–50 g/10 min and a $T_{crit}$ for RCP of at most 0° C., preferably at most −5° C. Such a PP may e.g. be chosen from PP-homo-block copolymers, PP-random-block copolymers, or PP-homo and PP-block copolymer blends, and PP-random and PP-block copolymer blends. It is, however, preferred that layers of both polypropylene plastics A and B are present in the polypropylene multilayer pipe.

PP-homopolymers give the pipe good rigidity but the impact and creep properties are not very good. PP-block copolymers give good impact properties but the creep properties are like those for homopolymers due to the homopolymer matrix. Propylene ethylene random copolymers, which may be used for pressure pipe applications, like hot water pipe and industrial pipe, give flexibility and creep resistance, provided they contain sufficient high molecular weight components, but low rigidity and insufficient impact strength for many applications.

The processability and the tensile strength/creep properties of conventional propylene random copolymers can be improved by broadening the MWD using multi-stage polymerisation processes. In multi-stage polymerisation, the MWD of the polymer can be broadened by producing different molecular weight polymers in each stage. The MWD of a polymer becomes broader when lower molecular weight polymer is reactor-blended into the higher molecular weight polymer, adjusting the final MFR by choosing the right molecular weight and the reactor split in each stage. The molecular weight of the polymer in each step can be controlled by hydrogen, which acts as a chain transfer agent. Reactor temperature may also be used for controlling the molecular weight of polymer in each step. Multi-stage polymerisation is disclosed e.g. in Patent Application JP-91048, but that process concerns film grade polypropylene with a final $MFR_2$ of about 1.5.

However, if the processability is improved by just broadening the MWD of the propylene random copolymer, i.e. with addition of corresponding amounts of comonomer in each stage, also the fraction of low molecular weight random copolymer increases, which adversely affects the odour and also the taste of media in contact with the material.

Now according to the present invention a combination of different types of polypropylene materials, which in the following are called polypropylene A and polypropylene B, respectively, is utilised in a two- or multilayer design in order to achieve improved pipe properties in terms of processability, mechanical strength, inertness to contacting media, etc.

Using a high yield $TiCl_4$ catalyst, such as disclosed in U.S. Pat. No. 5,234,879 or U.S. Pat. No. 4,784,983, in a two-step polymerisation, an improved random copolymer, polypropylene A, comprising a very high molecular weight fraction of Mw>2,000,000 g/mole with random comonomer distribution and a lower molecular weight fraction with low or zero comonomer contents, is produced and used for one or more, preferably inner or core, layers of the pipe. This polypropylene A gives excellent mechanical strength including creep resistance and is further characterised in that it contains 1.0–10.0% by weight of ethylene or $C_4$–$C_{10}$-α-olefin repeating units and has an $MFR_2$ value of between 0.05 and 0.40 g/10 min. It is obtained by polvmerising propylene and ethylene or a $C_4$–$C_{10}$-α-olefin in the presence of a catalyst system, the procatalyst compound of which is a reaction product of at least a tetravalent titanium compound and a magnesium halide compound-end the cocatalyst component of which comprises an organoaluminium compound, optionally an external donor and hydrogen as a molecular weight regulating agent, to give said polypropylene, wherein the process for the preparation of said polypropylene comprises the following steps in any mutual order:

(a) copolymerising propylene and comonomer into a random copolymer at 40 to 110° C. using: a catalyst system of the above-mentioned type; propylene; a portion of ethylene or $C_4$–$C_{10}$-α-olefin comonomer leading to 1.0 to 10.0% by weight of ethylene or $C_4$–$C_{10}$-α-olefin repeating units in said random copolymer; and no or a minimal amount of hydrogen leading to an $MFR_{10}$ value of between 0.01 and 5.0 g/ 10 min for said random copolymer, if this step is performed first, or to an $MFR_2$ value for the total polymer product from this step of between 0.05 and 0.40 g/10 min, if this step is performed after step (b); the proportion of random copolymer produced in this step being from 20 to 80% by weight of the final polymer product, (b) polymerising propylene at 40 to 100° C. using: a catalyst system of the above-mentioned type; propylene; no or a minimal portion of ethylene or $C_4$–$C_{10}$-α-olefin comonomer leading to 0.0 to 1.0% by weight of ethylene or $C_4$–$C_{10}$-α-olefin comonomer repeating units in the polymer resulting from this step; and an amount of hydrogen leading to an $MFR_2$ value of between 20 and 1000 g/10 min for said polymer, if this step is performed first, or to an $MFR_2$ value for the total polymer product from this step of between 0.05 and 0.40 g/10 min, if this step is performed after step (a); the proportion of polymer produced in this step being from 80 to 20% by weight of the final polymer product.

For further, preferably outer, layer(s) in the pipe an elastomer-modified propylene B is used in order to improve the impact strength. This polymer can be produced as a homo-random-block PP copolymer in a three-stage process. It is characterised by containing from 1.0 to 30% by weight of ethylene or $C_4$–$C_{10}$-α-olefin repeating units and having an $MFR_2$ value of between 0.05 and 50 g/10 min, and being obtained by polymerising propylene and ethylene or a $C_4$–$C_{10}$-α-olefin in the presence of a catalyst system, the procatalyst component of which is a reaction product of at least a tetravalent titanium compound and a magnesium halide compound and the cocatalyst component of which comprises an organoaluminium compound, and hydrogen as a molecular weight regulating agent, as well as providing an elastomer component, to give said elastomer-modified polypropylene, wherein the process for the preparation of said polypropylene B comprises the following steps:

(a) copolymerising propylene and comonomer into a random copolymer at 40 to 110° C. using: a catalyst system of the above-mentioned type; propylene; a portion of ethylene or $C_4$–$C_{10}$-α-olefin comonomer leading to 1.0 to 10.0% by weight of ethylene or $C_4$–$C_{10}$-α-olefin repeating units in said random copolymer, and no or a minimal amount of hydrogen leading to an $MFR_{10}$ value of between 0.01 and 5.0 g/10 min for said random copolymer, if this step is performed first, or to an $MFR_2$ value for the total polymer product from this step of between 0.05 and 50 g/10 min, if this step is performed after step (b); the proportion of random copolymer produced in this step being from 20 to 80% by weight, (b) polymerising propylene at 40 to 110° C. using: a catalyst system of the above-mentioned type; propylene; no or a minimal portion of ethylene or $C_4$–$C_{10}$-α-olefin comonomer leading to 0.0 to 1.0% by weight of ethylene or $C_4$–$C_{10}$-α-olefin comonomer repeating units in the polymer produced in this step; and an amount of hydrogen leading to an $MFR_2$ value of between 20 and 1000 g/10 min for said polymer, if this step is performed first, or to an $MFR_2$ value for the total polymer product from this step of between 0.05 and 50 g/10 min, if this step performed after step (a); the proportion of polymer produced in this step being from 80 to 20% by weight, and (c) providing a rubbery copolymer (elastomer), the proportion of which is from 5 to 40% by weight of said polypropylene, to give said elastomer-modified polypropylene B.

In connection with polypropylene B the percentages by weight of (a) and (b) are based on the weight of (a) plus (b), whereas the percentage of (c) is based on the weight of (a) plus (b) plus (c).

The embodiment relating to the use of layer(s) of a non-elastomeric polypropylene (polypropylene A above) is based on the idea of producing a broad MWD polypropylene containing a high molecular weight propylene random copolymer fraction with improved comonomer distribution using high yield catalysts in two or several reactors at different reacting conditions. The comonomers incorporated in long chains as described in this invention destroy the regularity of the chains leading to the more homogeneous distribution of the essential tie-chains and entanglements needed for creep properties and toughness in pipe materials.

The low molecular weight fraction of polypropylene A contains no or a minimal portion of ethylene repeating units in the polymer. Added to the high molecular weight random copolymer fraction, this fraction is improving the processability. The optional low ethylene content fraction gives the total polymer the stiffness needed for rigid materials such as pipes.

A homopolymer or a minirandom copolymer (ethylene <1%) is, in fact, known to have a stiffness of 1400–1700 MPa, whereas a random copolymer with an ethylene content of ≥2% has a stiffness of <1000 MPa.

The problem of achieving this uneven comonomer distribution between the fractions with high yield $TiCl_4$ catalysts is solved in such a way that the amount of comonomer is split between the reactors. To the reactor where the high molecular weight propylene polymer is produced there is fed most or essentially all comonomer, compared to the reactor where the low molecular propylene polymer is produced. Higher amounts of comonomer can be fed because the solubility of the high molecular weight polymer is lower. The final comonomer content is adjusted by controlling the comonomer feed into the reactor. The intervals given in this publication always include both limits thereof.

In step (a) of preparing polypropylene A, a very high molecular weight random copolymer of propylene and ethylene is prepared, which gives the polypropylene its extremely high creep resistance. In step (b), essentially homopolymeric low molecular weight polypropylene is prepared, which gives the product good melt-processing properties and improved stiffness.

In the process of the invention, the orders of steps (a) and (b) can be chosen freely. It is, however, preferable to perform step (a) before step (b). Although different catalyst systems of the above-mentioned type can be used in steps (a) and (b), it is preferable to use the same catalyst system for both steps. According to a preferred embodiment, the catalyst system is added to step (a) and the same catalyst system is then used in steps (a) and (b).

Steps (a) and (b) can be performed in reactors, which may be of any type conventionally used for propylene polymerisation and copolymerisation preferably in loop (CSTR) or gas phase reactors, but it is most preferable to perform the first of the steps (a) and (b) in a loop (CSTR) reactor and the other step in a gas phase reactor, whereby any reaction medium used and unreactive reagents are removed from the loop reactor. In such a case, the procatalyst (also called catalyst in the art), cocatalyst and external donor are fed to the loop reactor. The reaction medium and unreacted reagents such as $H_2$ or comonomer can be removed by known methods between the steps.

It is also preferred to adjust the proportion of copolymer resulting from step (a) and the MFR values of step (a) and step (b) so that the FRR value ($MFR_{10}/MFR_2$), which is also a measure of the molecular weight distribution, of said polypropylene A is between 10 and 100, most preferably between 20 and 50.

The catalyst used in the present process for the preparation of polypropylene can be any suitable catalyst, which consists of a procatalyst, which is a reaction product of an at least tetravalent titanium compound and a magnesium halide compound, and a cocatalyst, which comprises an organoaluminum compound and, optionally, an external electron donor compound.

Preferably, said catalyst system has been prepared by:

(i) providing a procatalyst by reacting a magnesium halide compound, chosen from magnesium chloride, its complex with ethanol and other derivatives of magnesium chloride, with titanium tetrachloride and optionally with an internal donor, exemplified by the dialkyl phthalates, (ii) providing as cocatalyst an organoaluminium compound chosen from trialkyl aluminium compounds exemplified by triethyl aluminium, dialkyl aluminium chloride, alkyl aluminium sesquichloride, optionally (iii) providing as at least one external donor an ester of an aromatic acid exemplified by methyl p-methyl benzoate, or an organosilicon compound exemplified by alkoxy silanes or blends thereof, and, optionally (iv) prepolymerising a small amount of olefin by contacting the olefin with said procatalyst, cocatalyst and, optionally, the external donor.

In step (a) of the process for preparing polypropylene A, a portion of ethylene is preferably used, which leads to 1.0 to 7.0% by weight of ethylene units in the random copolymer resulting from this step. Further in step (a), preferably no or a minimal amount of hydrogen is used, which leads to an $MFR_{10}$ value of between 0.05 and 2.0 g/min for the random copolymer resulting from this step, if the step is performed first. Also, the portion of random copolymer resulting from step (a) is preferably from 40 to 80% by weight of said polymer propylene A. Thus it can be said that the polypropylene prepared by the process of the invention contains preferably more random copolymer than low molecular weight homopolymer or minirandom copolymer.

In step (b), low molecular weight essentially homopolymeric propylene is produced. The molecular weight is adjusted by means of hydrogen. If the hydrogen amount is too high, the molecular weight will be too low and the product will be useless as pipe, profile or moulding material. In step (b), an amount of hydrogen is preferably used, which leads to an $MFR_2$ value of between 30 and 500 g/10 min for the polymer produced in this step.

As mentioned before, too much ethylene units in the low molecular weight component leads to difficulties in retaining good stiffness properties of the product. Thus, in step (b) no or a minimal amount of ethylene is used, which preferably leads to 0.0 to 0.5% by weight of ethylene repeating units in the polymer resulting from this step. Preferably, the low molecular weight homopolymer fraction is smaller than the high molecular weight random copolymer fraction, i.e. the proportion of polymer resulting from step (b) is from 60 to 20% by weight of said polypropylene.

With regard to the elastomer-modified polypropylene (propylene B above), in step (a) a very high molecular weight random copolymer of propylene and ethylene is prepared, which gives the polypropylene its extremely high shape-resistance. In step (b), essentially homopolymeric low molecular weight polypropylene is prepared, which gives the product good melt-processing properties and improved stiffness. In step (c), the provided rubbery copolymer gives better impact resistance.

In the process, the order of steps (a) and (b) can be chosen freely. It is, however, preferable to perform step (a) before step (b). Although different catalyst systems of the above-mentioned type can be used in steps (a) and (b), it is preferable to use the same catalyst system for both steps. According to a preferred embodiment, the catalyst system is added to step (a) and the same catalyst system is then used both in steps (a) and (b).

Steps (a) and (b) can be performed in reactors, which may be of any type conventionally used for propylene polymerisation and copolymerisation, preferably in loop (CSTR) or gas phase reactors, but it is most preferred to perform the first of steps of (a) and (b) in a loop (CSTR) reactor and the other step in a gas phase reactor, whereby any reaction medium used and unreactive reagents are removed from the loop reactor. In such a case, the procatalyst (also called catalyst in the art), cocatalyst and external donor are fed to the loop reactor. The reaction medium and unreacted reagents such as $H_2$ or comonomer can be removed by known methods between the steps.

Preferably, steps (a) and (b) are performed so that the polypropylene resulting after the second step has an $MFR_2$ value of between 0.1 and 12 g/10 min.

It is also preferred to adjust the proportion of copolymer resulting from step (a) and the MFR values of step (a) and step (b) so that the FRR value ($MFR_{10}/MFR_2$), which is also a measure of the molecular weight distribution, of said propylene is between 10 and 100, most preferred between 20 and 50.

The catalyst used in the present process for the preparation of polypropylene can be any suitable catalyst, which consists of a procatalyst, which is a reaction product of an at least tetravalent titanium compound and a magnesium haln and a cocatalyst, which comprises an organoaluminium compound, an optionally external electron donor compound.

Preferably, said catalyst system has been prepared by:

(i) providing a procatalyst by reacting a magnesium halide compound, chosen from magnesium chloride, its complex with ethanol and other derivatives of magnesium chloride, with titanium tetrachloride and optionally with an internal donor, exemplified by the dialkyl phthalates, (ii) providing as cocatalyst an organoaluminium compound chosen from a trialkyl aluminium exemplified by triethyl aluminium, dialkyl aluminium chloride, alkyl aluminium sesquicholoride, optionally, (iii) providing as at least one external donor an ester of an aromatic acid exemplified by methyl p-methyl benzoate, or an organosilicon compound exemplified by alkoxy silanes or blends thereof, and, optionally (iv) prepolymerising a small amount of olefin by contacting the olefin with said protocatalyst, cocatalyst and, optionally, the external donor.

In step (a) of the process for preparing polypropylene B, a portion of ethylene or a $C_4$–$C_{10}$-α-olefin is preferably used, which leads to 1.0 to 7.0% by weight of ethylene or $C_4$–$C_{10}$-α-olefin units in the random copolymer resulting from this step. Further in step (a), preferably no or a minimal amount of hydrogen is used, which leads to an $MFR_{10}$ value of between 0.05 and 2.0 g/ min for the random copolymer resulting from this step, if the step is performed first. Also, the proportion of random copolymer resulting from step (a) is preferably from 40 to 80% by weight of the polypropylene resulting after the second step. Thus it can be said that the polypropylene prepared by the process of the invention contains preferably more random copolymer than low molecular weight homopolymer or minirandom copolymer.

In step (b), low molecular weight essentially homopolymeric or minirandom (having little comonomer) propylene is produced. The molecular weight is adjusted by means of hydrogen. If the hydrogen amount is too high, the molecular weight will be too low and the product will be useless as pipe, profile or moulding material. In step (b), an amount of hydrogen is preferably used, which leads to an $MFR_2$ value of between 30 and 500 g/10 min for the polymer produced in this step.

As mentioned before, too much ethylene units in the low molecular weight component leads to difficulties in retaining the stiffness properties of the product. Thus, in step (b) no or a minimal amount of ethylene is used, which preferably leads to 0.0 to 0.5% by weight of ethylene repeating units in the polymer resulting from this step. Preferably, the low molecular weight homopolymer fraction is smaller than the high molecular weight random copolymer fraction, i.e. the proportion of polymer resulting from step (b) is from 60 to 20% by weight of the polypropylene resulting from the second step.

The step (c) of providing an elastomer preferably follows steps (a) and (b) and most preferred, the order of steps is (a)→(b)→(c).

The step (c) of providing an elastomer can be performed in two ways. According to the first and more preferred way, said elastomer is provided by copolymerising at least propylene and ethylene into an elastomer. The conditions for the copolymerisation are within the limits of conventional EPM production conditions such as they are disclosed e.g. in Encyclopedia of Polymer Science and Engineering, Second Edition, Vol. 6, pp 545–558. A rubbery product is formed if the ethylene repeating unit content in the polymer is within a certain interval. Thus, preferably, in step (c), ethylene and propylene are copolymerised into an elastomer at such a ratio that the copolymer step (c) contains from 10 to 70% by weight of ethylene units. Most preferred, the ethylene unit content is from 30 to 50% by weight of the copolymeric propylene/ethylene elastomer.

According to preferred embodiments of the invention, the following conditions are independently chosen for the three-step process:

a temperature in step (c) of between 40 and 90° C., said catalyst system is added to step (a) and used in all the steps (a), (b) and (c), step (a) is performed in a loop (CSTR) reactor and steps (b) and (c) are performed in two separate gas phase reactors, the added comonomer portion is adjusted so that the proportion of ethylene repeating units after steps (a) and (b) is from 1 to 4% by weight and the proportion of ethylene repeating units after steps (a), (b) and (c) is from 5 to 15% by weight, in step (c) ethylene and propylene are copolymerised into an elastomer at a molar ratio ethylene/propylene of between 30/70 and 50/50.

According to another, less preferred, embodiment of the process, the elastomer in step (c) is provided by adding a ready-made or natural elastomer to the reaction product of steps (a) and (b), most preferred an impact-modified heterophasic polypropylene having from 15 to 50% by weight of a propylene-ethylene elastomeric copolymer.

The propylenes A and B discussed above are extremely creep-resistant (the creep resistance can be measured by registering the deflection of the material during 500–1000 h using 7.3 MPa load at 60° C.) and shows a creep level of ⅓ to ½ of that for regular PP (pipe grade) material. This is a very good result and can open new applications in piping.

Instead of or in addition to ethylene, the polypropylenes A and B can contain from 0.0 to 10.0% by weight of any other olefin such as butene-1, 4-methyl-pentene-1, hexene-1, octene-1 and decene-1 or combinations thereof.

The stiffness of these materials in combination, used in different layers of a pipe, is higher than that for homogeneous materials produced with about the same comonomer content in several reactors, or in only one reactor, but without losing in impact strength. The entanglements and tie-chains of the high molecular fraction in the material give the material better pipe properties, especially higher tensile strength, tensile modulus, charpy impact strength, and lower creep under load. The polypropylenes A and B also show longer time to failure at the same hoop stress levels in standard pipe pressure tests than conventionally produced random pipe material.

As mentioned before, it has been found in the present invention that the RCP properties are improved if the pipe is formed in several layers of different propylene plastic materials. By the expression "different polypropylene plastic materials" is meant propylene plastics which differ, for instance, in respect of the RCP value, i.e. they have different $T_{crit}$. The difference in $T_{crit}$ should be at least 5° C., preferably at least 10° C.

In its simplest design, the pipe according to the invention comprises two layers of different polymers, such as one layer of random-block-polypropylene and one layer of random-homo-polypropylene. However, it is preferred that the pipe is made up of more than two polymer layers, such as three or more layers. Most preferred at present, the inventive pipe is made up of three layers, such as, for instance, an inner layer of a first propylene plastic, an intermediate layer of a second propylene plastic and an outer layer of a third propylene plastic, of which the third propylene plastic can be of the same type as the first propylene plastic or differ therefrom. As an example, mention can be made of a pipe having an inner layer of elastomer-modified polypropylene, an intermediate layer of random-homo-polypropylene, and an outer layer of elastomer-modified polypropylene. The different polymer layers can be juxtaposed or, if desirable for improved adhesion, it is possible to arrange a thin intermediate layer between the polymer layers.

The different layers of the pipe can have the same or different thickness. For instance, the layer or layers of one polymer may have one thickness, whereas the layer or layers of the other polymer may have a different, greater or smaller thickness. If there are more layers of one polymer, also these layers may have the same or different thickness.

Further, the invention is not restricted to multi-layer pipes, which consist of a combination of two different polypropylene materials. Also combinations of three or more polypropylene materials are comprised by the invention.

The improved resistance to RCP that is obtained in the invention can be utilised in various ways.

According to one aspect, it is possible in pipes of a polymer material having relative low resistance to RCP (high $T_{crit}$) to improve this resistance at a comparatively low cost by combining the original polymer material with a layer of another polymer material having higher resistance to RCP (lower $T_{crit}$). The two polymer materials may be present as two or more, alternating layers. An embodiment of particular interest in this context is the combining of conventional random-polypropylene, which is a material having low resistance to RCP (high $T_{crit}$), with other polymer materials having lower $T_{crit}$, such as random-block-polypropylene.

The layer of random-polypropylene may then be provided with layers of the other polymer on the inside as well as the outside, or on one side only, preferably the outside. Another embodiment which is of interest in this context is the utilising of inexpensive polymer scrap as one layer and combining this with one or more layers of a better polymer material having lower $T_{crit}$.

When combining polymer materials having different $T_{crit}$, it is preferred according to the invention that the material having lower $T_{crit}$ is arranged at least on the outside of the pipe.

According to another and particularly preferred aspect, a resistance to RCP is achieved which is higher than that of any of the included, individual materials. By combining layers of different polypropylene plastics, e.g. random-homo-polypropylene and random-homo-block-polypropylene, it is thus possible according to the invention to provide pipes having a resistance to RCP which is better than the resistance for each of the included materials separately. This is surprising and means a special advantage of the invention.

The multilayer pipes according to the invention are produced in a manner known per se by, for instance, extrusion or injection moulding, preferably by coextrusion. For a more detailed description of such processes, reference is made to, for instance, D. Djordjevic, "Coextrusion", Rapra Review Reports, Vol. 6, No. 2, 1992, pp 51–53.

In order to further facilitate the understanding of the invention, some Examples follow below. The Examples of the invention are only intended to be illustrative and should not be interpreted as limiting to the invention. In all Examples, all parts and percentages relate to weight, unless otherwise stated.

EXAMPLES

The following tests and preparations were made:

Mechanical tests from 4 mm compression moulded plaques. The specimens were according to ISO 527.

Tensile strength according to ISO 527 (cross head speed= 55 mm/min).

Tensile modules according to ISO 527 (cross head speed=1 mm/min).

Charpy, notched impact according to ISO 179/1eA.

Creep test is a Borealis tensile creep method for ranking of pipe materials. In the method a constant stress is applied to a specimen (a modified ISO dumb bell=120 mm long, thickness=2 mm). The test temperature=60° C. (oven) and the stress=7.3 mPa (for PP materials).

The increase of strain with time is recorded 500 to 1000 h.

The creep is defined as the elongation at 100 h in mm units corresponding to stiffness and the slope between 100 h and 400 h in angle units.

This creep resistance test method is comparable to e.g. ISO 899–1, DIN 53444 and ASTM 2990.

Example 1

Preparation and properties of high MW very broad MWD two-stage random homo-PP copolymer.

The PP copolymers were produced in a pilot plant having a loop reactor and a fluid bed gas phase reactor connected in series. The catalyst, cocatalyst and donor were fed to the loop reactor. The reaction medium of loop was flashed away before the solid polymer containing the active catalyst entered the gas phase.

The prepolymerised MgCl$_2$-supported Ti catalyst (prepared according to U.S. Pat. No. 5, 234, 879, included by reference) was used in the polymerisation. Cocatalyst was triethyl aluminium (TEA) and external donor dicyclopentanedimethoxysilane (DCPDMS). Al/Ti mole ratio was 150 and Al/donor mole ratio 5.

In the first stage (loop reactor) high MW propylene-ethylene random copolymer was produced, and the polymerisation was continued in the second stage (gas phase reactor) which produced low MW homo-PP. The polymerisation temperature used in both stages was 70° C. The production rate was 6 kg/h for the first stage and 4 kg/h for the second stage, which means a production split of 60/40. The MFRs of the first stage and final product were adjusted with separate hydrogen feeds.

More detailed properties of the material produced in each stage are shown in Table 1.

Example 2

Preparation and properties of moderately broad MWD two-stage random homo-PP copolymer.

The polymer was polymerised as in Example 1, except that the production split was 80/20 and the MW of the random PP produced in the first stage was adjusted slightly lower with hydrogen feed. More detailed properties of the material produced in each stage are shown in Table 1.

Example 3

Preparation and properties of very broad MWD two-stage random minirandom-PP copolymer.

The polymer was polymerised as in Example 1, except that the production split was 6⅓9, and instead of homo-PP the second stage produced propylene-ethylene random copolymer containing 0.5 w-% ethylene. More detailed properties of the material produced in each stage are shown in Table 1.

Example 4

Preparation and properties of broad MWD two-stage homo-random PP copolymer.

The polymer was polymerised as in Example 1, except that the first stage (loop reactor) produced low MW homo-PP and the second stage high MW propylene-ethylene random copolymer containing about 4 w-% ethylene. The production split was 41/59. More detailed properties of the material produced in each stage are shown in Table 1.

Example 5

Preparation and properties of moderately broad MWD two-stage random homo-PP copolymer with another catalyst and higher ethylene content random-PP.

The polymer was polymerised as in Example 1, except that the catalyst was prepared according to U.S. Pat. No. 4, 784, 983, included by reference, and the high MW random-PP produced in the first stage had higher ethylene content and slightly lower MW. More detailed properties of the material produced in each stage are shown in Table 1.

Example 6

Preparation and properties of medium broad MWD two-stage random homo-PP copolymer.

The polymer was polymerised as in Example 1, except that the production split was 59/41, the MW of the random-PP produced in the first stage was adjusted slightly lower and that as external donor, cyclohexyl methyl dimethoxy silane was used. More detailed properties of the material produced in each stage are shown in Table 1.

Examples 7a–7c

Preparation and properties of very broad MWD two-stage random homo-PP copolymers.

The polymers were polymerised as in Example 1. More detailed properties of the materials produced in each stage are shown in Table 2.

Example 8a

Preparation and properties of broad MWD three-stage impact-modified random homo-PP copolymer.

The PP copolymer was produced in a pilot plant having a loop reactor and two fluid bed gas phase reactors connected in series. The catalyst, cocatalyst and donor were fed to the loop reactor. The reaction medium of loop was flashed away before the solid polymer containing the active catalyst entered the first gas phase.

The prepolymerised MgCl2-supported Ti catalyst (prepared according to U.S. Pat. No. 5, 234, 879, included by reference) was used in the polymerisation. Cocatalyst was triethyl aluminium (TEA) and external donor cyclohexyl methyl dimethoxy silane.

In the first stage (loop reactor) high MW propylene-ethylene random copolymer was produced. The polymerisation was continued in the second stage (gas phase reactor) which produced low MW homo-PP, and the third stage (gas phase) produced rubbery ethylene-propylene copolymer. The ethylene/propylene mole ratio in the third stage was 36/64. The production split of the stages in weight fractions was 63/12/25. The polymerisation temperature used in all stages was 70° C. The MFRs measured after the polymerisation stages were adjusted with separate hydrogen feeds.

More detailed properties of the material produced in each stage are shown in Table 3.

Example 8b

Preparation and properties of broad MWD three-stage impact-modified random homo-PP copolymer.

The polymer was polymerised as in Example 8a, except that the production split was 80/20/20. More detailed properties of the material produced in each stage are shown in Table 3.

Example 9

Multilayer pipes comprising 2 or 3 layers with a diameter of 110 mm and a pipe wall thickness of 10 mm were extruded using a conventional Cincinnati pipe extrusion line equipped with a multilayer tool. The running speed was 1.3 m/min and the melt temperature 210° C. The extruded pipes were conditioned at room temperature during 1 week before testing. The materials used for the pipes were the polymers prepared according to Examples f7a–c and 8a–b. More particularly, the polymers prepared in Examples 7a–c were blended at the weight ratio 1:1:1 and the resulting polymer blend is called PP2. Similarly, the polymers prepared in Examples 8a and 8b were blended at the weight ratio 1:1 and the resulting polymer blend is called PP1. Data for PP1 and PP2 are given in Table 4 and the multilayer pipe combinations are seen in Table 5. In Table 6, the measured RCP-critical temperature data and the pipe pressure test data are shown.

From Table 6 it is evident that the RCP resistance, measured as $T_{crit}$, is very good for the multilayer polypropylene pipes according to the invention, keeping in mind that $T_{crit}$ for conventional polypropylene homopolymer is above about +23° C.

From the pressure testing data of Table 6 it is evident that the multilayer polypropylene pipes according to the invention are very good also in this respect. For comparison it may be mentioned that according to the international standard ISO 1167:1966(E), thermoplastic pipes of polypropylene random copolymer for the conveyance of fluids should resist 16 MPa during 1 h at 20° C.

TABLE 1

RANDOM/HOMO COPOLYMERS for pipe

|  |  | Ex. 1 | Ex. 2 | Ex. 3 | Ex. 4 | Ex. 5 | Ex. 6 |
| --- | --- | --- | --- | --- | --- | --- | --- |
| MFR, 2.16 kg |  | 0.14 | 0.18 | 0.16 | 0.15 | 0.19 | 0.29 |
| MFR, 10 kg |  | 7 | 4 | 6.9 | 5.6 | 4.5 | 8.7 |
| FRR, 10/2.16 |  | 50 | 22.2 | 43.1 | 37.1 | 23.9 | 30 |
| FINAL ETHYLENE | w-% | 1.8 | 3 | 2.6 | 2.7 | 2.9 | 2.3 |
| 1st stage, ethylene | w-% | 4 | 4 | 3.9 | 0 | 5.8 | 3.9 |
| Melting peak, Tm | C | 161.2 | 161.3 | 149 | 161.4/154.4 | 159.7 | 155.1/160.9 |
| Tensile strength | MPa | 30 | 25.4 | 28.1 | 27.9 | 27.6 | 27.5 |
| elongation at yield | % | 8.7 | 10.5 | 10.8 | 9.7 | 9.4 | 10 |
| Tensile modulus | MPa | 1320 | 1010 | 1140 | 1110 | 1080 | 970 |
| Charpy, notched, RT | kJ/m$^2$ | 6.4 | 10.1 | 5.8 | 8.1 | 8.3 | 10.7 |
| Charpy, notched, 0° C. | kJ/m$^2$ | 2.1 | 2.6 | 2 | 2.3 | 2 | 3.1 |
| Creep at 60° C., 7.3 MPa |  |  |  |  |  |  |  |
| displacement at 100 h/slope | mm/deg | 0.6/0.74 | 0.6/1.0 | 1.0/1.0 |  | 1.1/0.6 | 1.1/0.66 |
| 1st stage, MFR, 2.16 kg b→a |  |  |  |  | 105 |  |  |
| 1st stage, MFR, 10 kg a→b |  | 0.09 | 0.94 | 0.19 |  | 0.3 | 1.7 |
| Production split |  | 60/40 | 80/20 | 61/39 | 41/59 | 60/40 | 59/41 |

TABLE 2

RANDOM/HOMO COPOLYMERS for pipe

|  |  | Ex. 7a | Ex. 7b | Ex. 7c |
| --- | --- | --- | --- | --- |
| MFR, 2.16 kg |  | 0.13 | 0.14 | 0.16 |
| MFR, 10 kg |  | 6.2 | 6.1 | 7.2 |
| FRR, 10/2.16 |  | 47.7 | 43.6 | 45 |
| FINAL ETHYLENE | w-% | 2 | 2 | 1.9 |
| 1st stage, ethylene | w-% | 4 | 4 | 4.1 |

TABLE 2-continued

RANDOM/HOMO COPOLYMERS for pipe

|  |  | Ex. 7a | Ex. 7b | Ex. 7c |
|---|---|---|---|---|
| Melting peak, Tm | C | 160 | 157.8 | 160.2 |
| Tensile strength | MPa | 30.5 | 30.4 | 30.7 |
| elongation at yield | % | 9 | 9.1 | 8.8 |
| Tensile modulus | MPa | 1310 | 1300 | 1330 |
| Charpy, notched, RT | kJ/m$^2$ | 6.4 | 6.8 | 6.3 |
| Charpy, notched, 0° C. | kJ/m$^2$ | 2.2 | 2.1 | 1.9 |
| Creep at 60° C., 7.3 MPa displacement at 100 h/slope | mm/deg | 0.80/0.60 | 0.75/0.64 | 0.6/0.7 |
| 1st stage, MFR, 2.16 kg b→a |  |  |  |  |
| 1st stage, MFR, 10 kg a→b |  | 0.1 | 0.1 | 0.09 |
| Production split |  | 60/40 | 60/40 | 60/40 |

TABLE 3

RANDOM/HOMO-BLOCK COPOLYMERS for pipe

|  |  | Ex. 8a | Ex. 8b |
|---|---|---|---|
| MFR, 2.16 kg | g/10 | 0.14 | 0.28 |
| MFR, 10 kg |  | 3.7 | 7.9 |
| FRR, 10/2.16 |  | 26.4 | 28.3 |
| FINAL ETHYLENE | w-% | 6.8 | 9.1 |
| 2nd stage, ethylene | w-% | 1.7 | 1.8 |
| 1st stage, ethylene | w-% | 3.5 | 3.8 |
| Melting peak, Tm | ° C. | 154.6 | 150.5 |
| Tensile strength | MPa | 21.3 | 19 |
| elongation at yield | % | 9.2 | 10.1 |
| Tensile modulus | MPa | 860 | 760 |
| Charpy, notched, RT | kJ/m$^2$ | 69 | 71 |
| Charpy, notched 0° C. | kJ/m$^2$ | 18.1 | 22 |
| Creep at 60° C., 7.3 MPa displacement at 100 h/slope | mm/deg | 3.2/5.1 | — |
| Production split |  | 63/12/25 | 60/20/20 |

TABLE 4

| Material |  |  |  |  |
|---|---|---|---|---|
| PP1 | PPr-h-b | MFR$_2$ = 0.13 | MFR$_{10}$ = 6.0 | E-modulus = 800 MPa |
| PP2 | PPr-h | MFR$_2$ = 0.13 | MFR$_{10}$ = 6.0 | E-modulus = 1340 MPa |

TABLE 5

| Multilayer pipe | Number of layers | Design (outer/inner layer, wall thickness distribution %) |
|---|---|---|
| A | 2 | PP1/PP2, 30/70 |
| B | 2 | PP1/PP2, 20/80 |
| C | 3 | PP1/PP2/PP1, 30/60/10 |
| D | 3 | PP1/PP2/PP1, 20/70/10 |

TABLE 6

| Multilayer pipe | RCP, Tc ° C. | Pressure testing, 20° C. (stress level, time to failure) | Fracture type |
|---|---|---|---|
| A | −7° C. | 16.0 MPa >9100 h | (Running) |
|  |  | 19.5 MPa, 240 h | Ductile |
| B | −2° C. | 16.0 MPa >9100 h | (Running) |
|  |  | 19.5 MPa, 212 h | Ductile |
| C | −5° C. | 16.0 MPa >9120 h | (Running) |
|  |  | 19.5 MPa, 302 h | Ductile |
| D | 0° C. | 16.0 MPa >9150 h | (Running) |
|  |  | 19.5 MPa, 251 h | Ductile |

What is claimed is:

1. A multilayer pipe of propylene plastic, wherein the pipe has a resistance to rapid crack propagation expressed as the critical temperature of the pipe, which is equal to or lower than 0° C., the critical temperature for a pipe being the lowest temperature at which an axial crack initiated in the pipe propagates a distance in the pipe of at most 4 times the diameter of the pipe at a pressure difference between the inside and outside of the pipe of 0.5 MPa; and that at least one of the layers of the pipe comprises a polypropylene, which is selected from polypropylene A [and] or polypropylene B, polypropylene A being a polypropylene containing from 1.0 to 10.0% by weight of ethylene or $C_4$–$C_{10}$-α-olefin repeating units and having an MFR$_2$ value of between 0.05 and 0.40 g/10 min, and being obtained by polymerising propylene and ethylene or a $C_4$–$C_{10}$-α-olefin in the presence of a catalyst system, the procatalyst component of which is a reaction product of at least a tetravalent titanium compound and a magnesium halide compound and the cocatalyst component of which comprises an organoaluminium compound, optionally an external donor and hydrogen as a molecular weight regulating agent, to give said polypropylene, wherein the process for the preparation of said polypropylene comprises the following steps in any mutual order:

(a) copolymerising propylene and comonomer into a random copolymer at 40 to 110° C. using: a catalyst system of the above-mentioned type; propylene; a portion of ethylene or $C_4$–$C_{10}$-α-olefin comonomer leading to 1.0 to 10.0% by weight of ethylene or $C_4$–$C_{O1}$-α-olefin repeating units in said random copolymer; and no or a minimal amount of hydrogen leading to an MFR$_{10}$ value of between 0.01 and 5.0 g/10 min for said random copolymer, if this step is performed first, or to an MFR$_2$ value for said polypropylene of between 0.05 and 0.40 g/10 min, if this step is performed after step (b); the proportion of random polymer produced in this step being from 20 to 80% by weight of said polypropylene A, (b) polymerising propylene at 40 to 100° C. using: a catalyst system of the above-mentioned type; propylene; no or a minimal portion of ethylene or $C_4$–$C_{10}$-α-olefin comonomer leading to 0.0 to 1.0% by weight of ethylene or $C_4$–$C_{10}$-α-olefin comonomer repeating units in the polymer produced in this step; and an amount of hydrogen leading to an MFR$_2$ value of between 20 and 1000 g/10 min for said polymer, if this step is performed first, or to an MFR$_2$ value for said polypropylene A of between 0.05 and 0.40 g/10 min, if this step is performed after step (a); the proportion of polymer produced in this step being from 80 to 20% by weight of said polypropylene A; and polypropylene B being an elastomer-modified polypropylene containing from 1.0 to 30% by weight of ethylene or $C_4$–$C_{10}$-α-olefin repeating units and having an MFR$_2$ value of between 0.05 and 50 g/10 min, and being obtained by polymerising propylene and ethylene or a C$_4$–C$_{10}$-α-olefin in the presence of a catalyst system, the procatalyst component of which is a reaction product of at least a tetravalent titanium compound and a magnesium halide compound and the cocatalyst component of which comprises an organoaluminium compound, and hydrogen as a molecular weight regulating agent, as well as providing an elastomer component, to give said elastomer-modified polypropylene, wherein the process for the preparation of said polypropylene B comprises the following steps:

(a) copolymerising propylene and comonomer into a random copolymer at 40 to 110° C. using: a catalyst system of the above-mentioned type; propylene; a portion of ethylene or C$_4$–C$_{10}$-α-olefin comonomer leading to 1.0 to 10.0% by weight of ethylene or C$_4$–C$_{10}$-α-olefin repeating units in said random copolymer; and no or a minimal amount of hydrogen leading to an MFR$_{10}$ value of between 0.01 and 5.0 g/10 min for said random copolymer, if this step is performed first, or to an MFR$_2$ value for said polypropylene B of between 0.05 and 50 g/l 0 min, if this step is performed after step (b); the proportion of random copolymer produced in this step being from 20 to 80% by weight, (b) polymerising propylene at 40 to 110° C. using: a catalyst system of the above-mentioned type; propylene; no or a minimal portion of ethylene or C$_4$–C$_{10}$-α-olefin comonomer leading to 0.0 to 1.0% by weight of ethylene or C$_4$–C$_{10}$-α-olefin comonomer repeating units in the polymer produced in this step; and an amount of hydrogen leading to an MFR$_2$ value of between 20 and 1000 g/10 min for said polymer, if this step is performed first, or to an MFR$_2$ value for said polypropylene B of between 0.05 and 50 g/10 min, if this step is performed after step (a); the proportion of the polymer produced in this step being from 80 to 20% by weight, and (c) providing a rubbery copolymer (elastomer), the proportion of which is from 5 to 40% by weight of said polypropylene, to give said elastomer-modified polypropylene.

2. A multilayer pipe according to claim 1, wherein the pipe has a critical temperature which is equal to or lower than −50° C.

3. A multilayer pipe according to claim 1, wherein the order of steps for producing polypropylene A and B is (a)→(b).

4. A multilayer pipe according to claim 3, wherein said catalyst system is added to step (a) and the same catalyst system is then used both in steps (a) and (b).

5. A multilayer pipe according to claim 1, wherein step (a) is performed in a loop (CSTR) reactor and step (b) is performed in a gas phase reactor, whereby any reaction medium used and any unreacted reagents are removed from the loop reactor between step (a)-and step (b).

6. A multilayer pipe according to claim 1, wherein the proportion of copolymer resulting from step (a) and the MFR values of step (a) and step (b) are such that the FRR value (=MFR$_{10}$/MFR$_2$) of said polypropylene is between 10 and 100.

7. A multilayer pipe according to claim 1, wherein in step (c), said elastomer is provided by copolymerising at least propylene and ethylene into an elastomer.

8. A multilayer pipe according to claim 1, wherein said pipe also comprises, in at least one layer a polypropylene polymer selected form the group consisting of a) polypropylene random copolymers, polypropylene homopolymers, and polypropylene random copolymer/polypropylene homopolymer blends having an MFR$_2$-value of 0.05–0.4 g/10 min and a comonomer content of at most 5% by weight, said comonomer being selected form ethylene and C$_4$–C$_{10}$-α-olefins, and b) polypropylene polymers having a rubbery phase constituting about 10–30% by weight of the total polymer, a total ethylene content of about 4–15% by weight, an MFR$_2$-value of 0.05–50 g/10 min and a critical temperature of at most 0° C.

9. A multilayer pipe according to claim 1, wherein the pipe has two layers, that the inner layer comprises polypropylene A, and the outer layer comprises polypropylene B.

10. A multilayer pipe according to claim 1, wherein the pipe has three layers, and that the intermediate layer comprises poly-propylene A, while the inner and outer layers comprise polypropylene B.

* * * * *

UNITED STATES PATENT AND TRADEMARK OFFICE
CERTIFICATE OF CORRECTION

PATENT NO. : 6,187,402 B1
DATED : February 13, 2001
INVENTOR(S) : Ek et al.

It is certified that error appears in the above-identified patent and that said Letters Patent is hereby corrected as shown below:

Title page,
Item [56], References Cited, Foreign Patent Documents, WO96/22485 * 7/1996: "(GB)" should read -- (WO) --

Column 2,
Line 27, after the word "pressure" delete "sure"

Column 3,
Line 50, "ess" should read -- less --

Column 4,
Line 55, "compound-end" should read -- compound and --

Column 6,
Line 24, "of ≥2%" should read --of ≥ 2%--

Column 7,
Line 24, "(iv)" should begin a new paragraph

Column 8,
Line 28, "propylene" should read -- polypropylene --
Line 34, "haln and" should read -- halide compound, and --
Line 35, insert -- and -- after the word "compound"

Column 12,
Line 33, "6 1/39" should read -- 61/39 --

Column 16,
Line 22, delete the word "[and]"

UNITED STATES PATENT AND TRADEMARK OFFICE
CERTIFICATE OF CORRECTION

PATENT NO.   : 6,187,402 B1
DATED        : February 13, 2001
INVENTOR(S)  : Ek et al.

It is certified that error appears in the above-identified patent and that said Letters Patent is hereby corrected as shown below:

<u>Column 18,</u>
Line 3, "-50°C" should read -- -5°C --

Signed and Sealed this

Fourteenth Day of May, 2002

Attest:

JAMES E. ROGAN
*Attesting Officer*      *Director of the United States Patent and Trademark Office*